(12) United States Patent
Hirata et al.

(10) Patent No.: US 10,914,931 B2
(45) Date of Patent: Feb. 9, 2021

(54) OBSERVATION DEVICE

(71) Applicant: OLYMPUS CORPORATION, Tokyo (JP)

(72) Inventors: Tadashi Hirata, Tokyo (JP); Shintaro Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 284 days.

(21) Appl. No.: 16/003,402

(22) Filed: Jun. 8, 2018

(65) Prior Publication Data

US 2018/0329193 A1 Nov. 15, 2018

Related U.S. Application Data

(63) Continuation of application No. PCT/JP2015/084805, filed on Dec. 11, 2015.

(51) Int. Cl.
*G02B 21/08* (2006.01)
*G02B 21/26* (2006.01)
(Continued)

(52) U.S. Cl.
CPC .......... *G02B 21/086* (2013.01); *G02B 21/06* (2013.01); *G02B 21/14* (2013.01); *G02B 21/26* (2013.01)

(58) Field of Classification Search
CPC .... G02B 21/088; G02B 21/086; G02B 21/24; G02B 21/04; G02B 21/14; G02B 21/26;
(Continued)

(56) References Cited

U.S. PATENT DOCUMENTS 5,038,258 A  8/1991 Koch et al.
5,751,475 A * 5/1998 Ishiwata ................. G02B 21/14
                                                    359/371
(Continued)

FOREIGN PATENT DOCUMENTS

EP    1553166 A1    7/2005
EP    1615061 A1    1/2006
(Continued)

OTHER PUBLICATIONS

International Search Report dated Mar. 8, 2016 issued in International Application No. PCT/JP2015/084805.
(Continued)

*Primary Examiner* — Jie Lei
(74) *Attorney, Agent, or Firm* — Scully, Scott, Murphy & Presser, P.C.

(57) ABSTRACT

An observation device including: a stage having a transparent pedestal surface; an illumination system under the pedestal surface, the illumination system emitting illumination light toward the pedestal surface; and an object system under the pedestal surface for capturing transmission light generated from the illumination light, reflected off a reflection surface and transmitted through a sample. Wherein a first light path in the illumination system is different from a second light path in the object system, in a first pupil surface of the illumination system, the illumination system generates the illumination light by restricting light in a first transparent region, in a second pupil surface of the object system, the object system restricts the transmission light in a second transparent region, and the second transparent region has first and second subregions with different transmittance, the second subregion located between the first subregion and an edge of the second transparent region.

10 Claims, 19 Drawing Sheets

(51) Int. Cl.
*G02B 21/14* (2006.01)
*G02B 21/06* (2006.01)

(58) Field of Classification Search
CPC .... G02B 21/06; G02B 21/0032; G02B 21/18; G02B 5/005; G02B 26/023
USPC ........ 359/385, 368, 372, 387, 391, 393, 398
See application file for complete search history.

(56) References Cited

U.S. PATENT DOCUMENTS

| | | |
|---|---|---|
| 6,025,956 A | 2/2000 | Nagano et al. |
| 9,766,445 B2 | 9/2017 | Kei et al. |
| 2001/0028497 A1 | 10/2001 | Uhl |
| 2002/0191281 A1 | 12/2002 | Osa et al. |
| 2004/0113043 A1 | 6/2004 | Ishikawa et al. |
| 2005/0105172 A1 | 5/2005 | Hasegawa et al. |
| 2006/0072190 A1 | 4/2006 | Okugawa et al. |
| 2007/0177255 A1 | 8/2007 | Kanegasaki et al. |
| 2008/0201083 A1 | 8/2008 | Hata et al. |
| 2009/0051901 A1 | 2/2009 | Shen et al. |
| 2010/0208053 A1 | 8/2010 | Hasegawa et al. |
| 2011/0089339 A1 | 4/2011 | Yamashita et al. |
| 2013/0130307 A1 | 5/2013 | Sugiyama et al. |
| 2013/0156287 A1 | 6/2013 | Houjou et al. |
| 2013/0022907 A1 | 9/2013 | Sakaguchi |
| 2013/0229707 A1 | 9/2013 | Sakaguchi |
| 2014/0333997 A1* | 11/2014 | Oda .................... G02B 21/084 359/387 |
| 2014/0340476 A1 | 11/2014 | Sun et al. |
| 2015/0253561 A1 | 9/2015 | Lee et al. |
| 2015/0264235 A1 | 9/2015 | Houjou et al. |
| 2015/0362716 A1 | 12/2015 | Kei et al. |
| 2016/0048011 A1 | 2/2016 | Suzuki et al. |
| 2017/0261732 A1 | 9/2017 | Takahashi et al. |
| 2017/0355949 A1 | 12/2017 | Hirata et al. |
| 2018/0267285 A1* | 9/2018 | Hirata .................... G02B 21/14 |
| 2019/0219810 A1 | 7/2019 | Mizunaka et al. |
| 2020/0088985 A1* | 3/2020 | Hirata .................... G02B 21/14 |

FOREIGN PATENT DOCUMENTS

| | | |
|---|---|---|
| EP | 2312367 A1 | 4/2011 |
| EP | 2562245 A1 | 2/2013 |
| EP | 2955502 A1 | 12/2015 |
| EP | 3211469 A1 | 8/2017 |
| JP | S57-178212 A | 11/1982 |
| JP | H02-232614 A | 9/1990 |
| JP | H02-272412 A | 11/1990 |
| JP | H07-261089 A | 10/1995 |
| JP | H09-179034 A | 7/1997 |
| JP | 2001-166219 A | 6/2001 |
| JP | 2003-021628 A | 1/2003 |
| JP | 2004-070276 A | 3/2004 |
| JP | 2004-318185 A | 11/2004 |
| JP | 2004-348104 A | 12/2004 |
| JP | 2004-361485 A | 12/2004 |
| JP | 2005-010258 A | 1/2005 |
| JP | 2005-326495 A | 11/2005 |
| JP | 2005-331623 A | 12/2005 |
| JP | 2006-030583 A | 2/2006 |
| JP | 2006-174764 A | 7/2006 |
| JP | 2006-179387 A | 7/2006 |
| JP | 2007-264410 A | 10/2007 |
| JP | 2007-323094 A | 12/2007 |
| JP | 2008-092882 A | 4/2008 |
| JP | 2008-209726 A | 9/2008 |
| JP | 2009-217222 A | 9/2009 |
| JP | 2011-008188 A | 1/2011 |
| JP | 2011-102970 A | 5/2011 |
| JP | 2011-141444 A | 7/2011 |
| JP | 2013-238797 A | 11/2013 |
| JP | 2015-084059 A | 4/2015 |
| JP | 2016-000007 A | 1/2016 |
| JP | 6066110 B2 | 1/2017 |
| JP | 2018-072845 A | 5/2018 |
| KR | 100813915 B1 | 3/2008 |
| WO | 2006/101056 A1 | 9/2006 |
| WO | 2011/132586 A1 | 10/2011 |
| WO | 2012/029817 A1 | 3/2012 |
| WO | 2013/047315 A1 | 4/2013 |
| WO | 014/038871 A1 | 3/2014 |
| WO | 2014/041820 A1 | 3/2014 |
| WO | 2016/158780 A1 | 10/2016 |

OTHER PUBLICATIONS

Extended Supplementary European Search Report dated Dec. 19, 2017 in European Patent Application No. 16 77 2661.1.
Extended Supplementary European Search Report dated Oct. 29, 2018 in European Patent Application No. 16 77 2663.7.
Japanese Office Action dated Dec. 3, 2019 in Japanese Patent Application No. 2017-225493.
Office Action dated Sep. 7, 2018 received in U.S. Appl. No. 15/607,666.
Office Action dated Feb. 21, 2019 received in U.S. Appl. No. 15/690,024.
Office Action dated Apr. 6, 2020 received in U.S. Appl. No. 15/984,949.
Lugmaier, R.A. et al., "Phase contrast and DIC illumination for AFM hybrids", Ultramicroscopy, vol. 104, No. 3-4, pp. 255-260, ISSN: 0304-3991 (2005).
Ford, T.N. et al., "Phase-gradient microscopy in thick tissue with oblique back-illumination", Nature Methods, vol. 9, No. 12, pp. 1195-1197, ISSN: 1548-7091 (2014).
Webb, K. F. et al., "Condenser-free contrast methods for transmitted-light microscopy: Condenser-free contrast methods", Journal of Microscopy, vol. 257, No. 1, pp. 8-22, ISSN: 0022-2720 (2014).
Written Opinion dated Mar. 8, 2016 received in related International Application No. PCT/JP2015/084805.
International Search Report dated Jun. 21, 2016 together with the Written Opinion received in related International Application No. PCT/JP2016/059686.
International Search Report dated Jun. 28, 2016 together with the Written Opinion received in related International Application No. PCT/JP2016/059694.
International Search Report dated Aug. 29, 2017 together with the Written Opinion received in related International Application No. PCT/JP2017/019895.
International Search Report dated Dec. 19, 2017 together with the Written Opinion received in related International Application No. PCT/JP2017/033820.
International Search Report dated Mar. 22, 2016 together with the Written Opinion received in related International Application No. PCT/JP2015/085479.
Chinese Office Action dated Dec. 27, 2019 in Chinese Patent Application No. 201580085163.7.
Office Action dated Feb. 21, 2019 received in U.S. Appl. No. 16/690,024.

* cited by examiner

OBSERVATION DEVICE

CROSS-REFERENCE TO RELATED APPLICATION

The present application is a continuation of PCT/JP2015/084805 filed on Dec. 11, 2015, the entire contents of each of which are incorporated herein by reference.

BACKGROUND

Field

The present disclosure relates to an observation device.

Prior Art

An observation device using a phase difference observation method or a differential interference observation method has been known as a device that observes a subject such as a cell with no mark (for example, see JP-A-7-261089).

However, in an observation device of JP-A-7-261089, it is necessary to arrange an imaging optical system and an illumination optical system with a subject interposed therebetween, and there is inconvenience that the device becomes large and becomes complicated.

SUMMARY

The present disclosure is directed to an observation device capable of observing a subject, such as a cell, with no mark without increasing a size of the device.

Accordingly, there is provided an observation device including an illumination optical system that emits illumination light toward a side above a sample from a side below the sample, and an object optical system that captures transmission light which is the illumination light emitted from the illumination optical system, reflected from the side above the sample, and transmitted through the sample, at a path different from a path of the illumination optical system on the side below the sample. The illumination optical system includes a light source and a mask that restricts light from the light source to a specific emission region. A pupil modulation element having a region of which transmittance of the transmission light is partially different is provided in a position which is separated from an edge of a pupil near a pupil surface of the object optical system toward an inside in a radial direction.

Furthermore, after the illumination light emitted from the light source is emitted toward the side above the sample from the side below the sample, the illumination light is reflected from the side above the sample and is transmitted through the sample from the side above the sample toward the side below the sample. The transmission light transmitted through the sample is imaged by the object optical system at the path different from the path of the illumination optical system disposed on the side below the sample. Since both the light source unit and the object optical system are arranged on the side below the sample, it is possible to observe the subject such as the cell with no mark by capturing the transmission light without increasing the size of the device.

The light emitted from the light source becomes the illumination light of which the emission region is restricted by the mask. The sample is irradiated with the illumination light, and the illumination light is incident near the pupil surface of the object optical system. Since the region of which the transmittance is partially different is formed in the pupil modulation element disposed near the pupil surface, the light which is not transmitted through the sample is set so as to be transmitted near a boundary of the region of which the transmittance is partially different, and thus, it is possible to transmit the transmission light refracted by a refractive index of the sample through the region of which the transmittance is partially different.

Since a degree of attenuation of the light transmitted through the region is different due to transmittance different from transmittance of another portion, it is possible to acquire an image of a three-dimensional sample having light and shaded areas depending on a change in refractive index of the sample.

In this case, since the region is disposed in a position separated from the edge of the pupil toward the inside in the radial direction, it is possible to decrease the light ray height of the light transmitted through the inside of the object optical system, and it is possible to perform the observation using an image in which there is no brightness unevenness as a whole by preventing the occurrence of vignetting due to a flare stop.

The transmittance may be changed continuously or in stages in the region of the pupil modulation element.

With such a configuration, it is possible to attenuate the transmission light in the position separated from the edge of the pupil surface. That is, it is possible to acquire the same effect in a position other than the edge of the pupil surface instead of shading the image of the sample by blocking the transmission light refracted by the sample at the edge of the pupil surface. Accordingly, it is possible to prevent the occurrence of the brightness unevenness on the entire image by being blocked by the edge of the pupil surface, and it is possible to acquire the image of the sample having contrast.

The transmittance may be decreased toward an outside of the pupil surface in the radial direction in the region of the pupil modulation element.

With such a configuration, it is possible to prevent the occurrence of the brightness unevenness on the entire image by being blocked by the edge of the pupil surface, and it is possible to acquire the image of the sample having contrast.

The transmittance may be decreased toward the outside of the pupil surface in the radial direction over an entire circumference in the region of the pupil modulation element.

With such a configuration, it is possible to prevent the occurrence of the brightness unevenness on the entire image by being blocked by the edge of the pupil surface irrespective of the direction of the illumination light, and it is possible to acquire the image of the sample having contrast.

The region of the pupil modulation element may be a low transmittance region of which the transmittance is partially lower than transmittance of another region, and the emission region from the light source using the mask which is projected near the pupil surface of the object optical system may be disposed within the low transmittance region.

With such a configuration, the transmission light which reaches the pupil surface without being refracted by the sample are transmitted through the low transmittance region, and the intensity thereof is weakened. The transmission light which is refracted by the sample is not transmitted through the low transmittance region. Thus, a bright image is formed. Accordingly, it is possible to acquire the image of the sample having contrast.

A phase of the transmission light being transmitted may be changed in the low transmittance region.

With such a configuration, intensity is weakened or strengthened due to the inference of the transmission light which is influenced by the change of the phase and the transmission light which is not influenced by the change of the phase. Accordingly, it is possible to acquire an image capable of observing even a microstructure of the sample.

The emission region of the light source and the low transmittance region of the pupil modulation element may be formed in a shape of at least a part of an annular shape.

With such a configuration, the light refracted by the sample is shifted from the low transmittance region, and thus, a bright image is formed. It is possible to acquire an image in which shadows are isotropic.

The illumination optical system may include a collimator lens that renders the light from the light source to approximately parallel light.

With such a configuration, an image of an emission region of the transmission light using the mask is formed near the pupil surface. The transmission light which is refracted by the sample is transmitted through the region having low transmittance, and the transmission light which is not refracted by the sample is transmitted through the region having high transmittance. As a result, it is possible to acquire an image which is bright with no unevenness as a whole and includes a high-contrast image of the sample.

The pupil modulation element may have a region in which a phase of transmission light being transmitted is partially changed.

With such a configuration, intensity is weakened or strengthened due to the inference of the transmission light which is influenced by the change of the phase and the transmission light which is not influenced by the change of the phase. Accordingly, it is possible to acquire an image capable of observing even a microstructure of the sample.

According to such embodiments, it is possible to observe a subject such as a cell with no mark without increasing a size of a device.

DESCRIPTION OF EMBODIMENTS

Hereinafter, an observation device 1 according to a first embodiment will be described with reference to the drawings.

Figure 1:
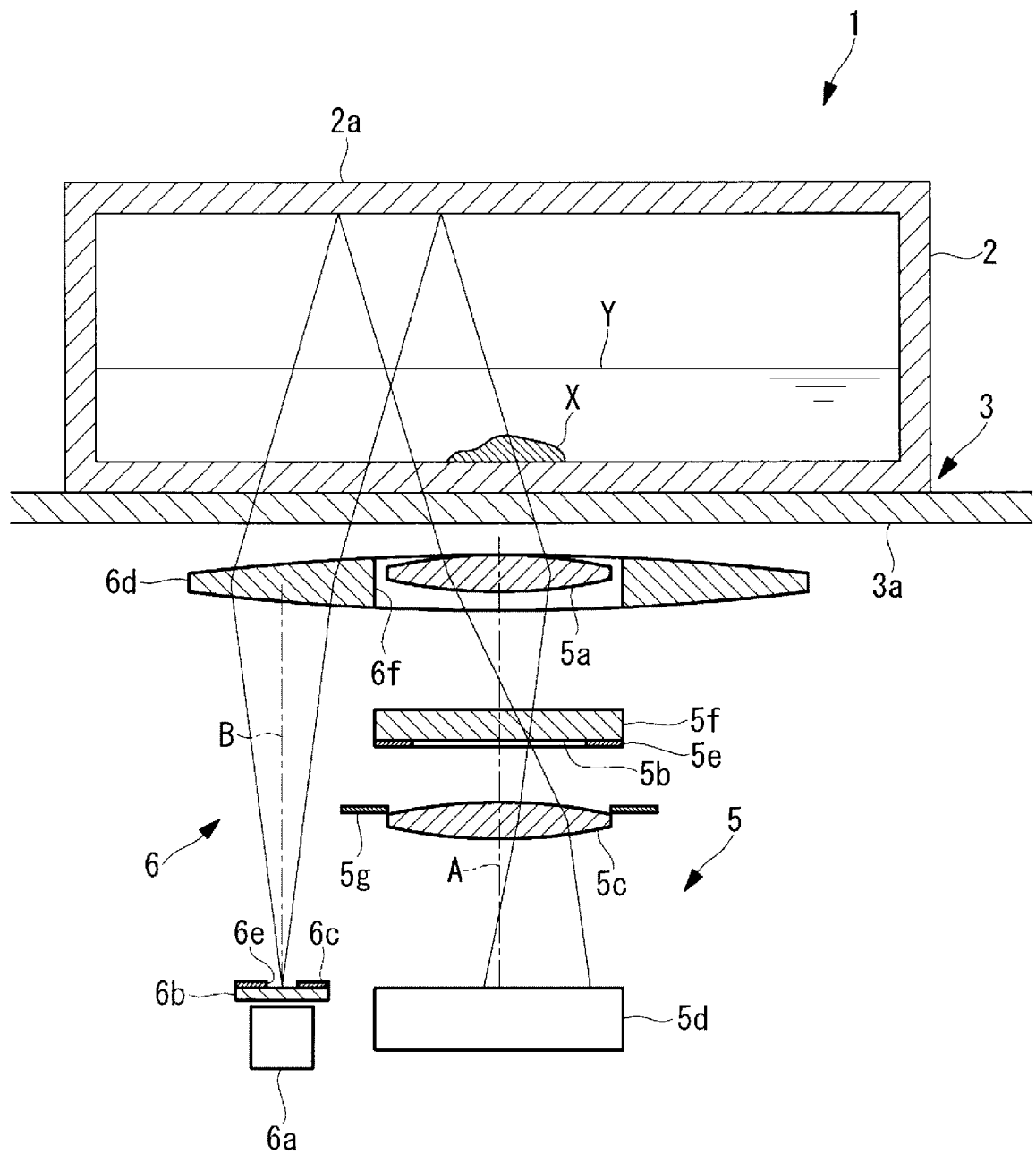
FIG. 1 is a longitudinal sectional view showing an observation device according to a first embodiment.

As stated above, as shown in FIG. 1, the observation device 1 according to the present embodiment includes a stage 3 that has a container 2 which contains a sample X, such as a cell mounted thereon, an object optical system 5 that is disposed below the stage 3, includes an object lens 5a that concentrates light which is transmitted through the stage 3 from above, and captures light which is transmitted through the sample X, and an illumination optical system 6 that is disposed on the outside of the object optical system 5 in a radial direction, emits illumination light upwards so as to cause the illumination light to be transmitted through the stage 3, and is at a path different from the object optical system 5.

The stage 3 includes a pedestal 3a made of an optically transparent material, for example, glass so as to cover a region above the object optical system 5 and the illumination optical system 6, and the container 2 is mounted on a top surface of the pedestal 3a.

For example, the container 2 is a cell culture flask including a top plate 2a, and is made of an optically transparent resin as a whole.

As shown in FIG. 1, the illumination optical system 6 includes an LED light source (light source) 6a that is disposed on the outside of the object optical system 5, a diffusion plate 6b that diffuses light from the LED light source 6a, an illumination mask (mask) 6c that is provided on the diffusion plate 6b and restricts illumination light from the LED light source 6a to a specific emission region, and a collimator lens 6d that renders the illumination light which is emitted from the restricted emission region and is gradually diffused to approximately parallel light.

Figure 2:
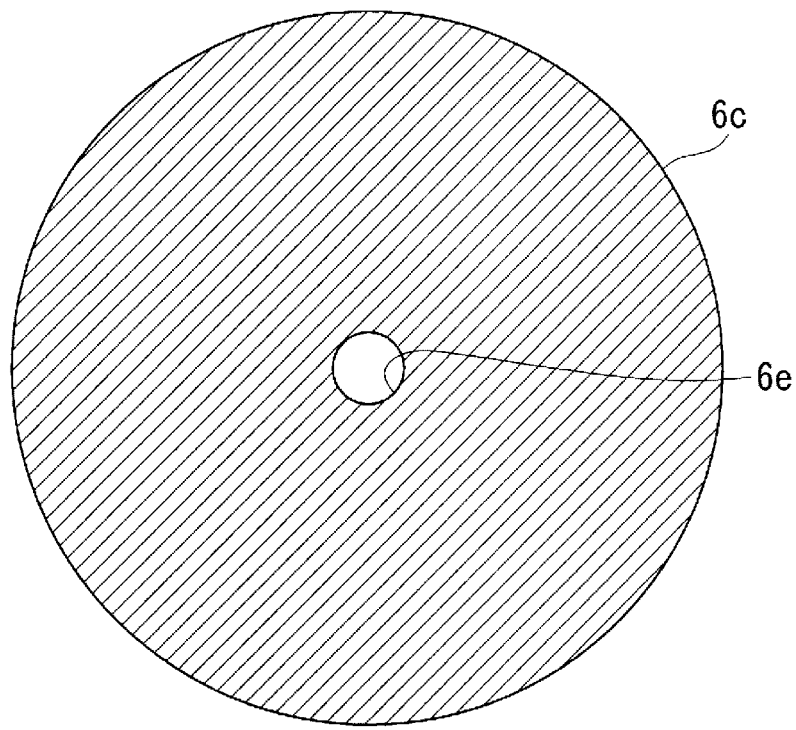
FIG. 2 is a front view showing an example of an illumination mask provided in the observation device of FIG. 1.

The illumination mask 6c has a circular opening 6e (emission region) through which the illumination light is transmitted in a light-shielding member, as shown in FIG. 2, and satisfies the following condition.

$$0.1 \leq ds/(NAo \cdot Fi) \leq 0.8 \qquad (1)$$

Here, ds is the size (a diameter in the example shown in FIG. 2) of the opening 6e of the illumination mask 6c in a direction in which the illumination light is diagonally emitted, Fi is a focal length of the collimator lens 6d, and NAo is a numerical aperture of the object optical system 5 close to the sample X.

When Expression (1) is less than a lower limit, it is likely to be influenced by vignetting within the object optical system 5, and it is likely to cause brightness unevenness. Dust or scratches on a lens surface constituting the object optical system 5 is projected on an image, and is likely to be more conspicuous. When Expression (1) is greater than an upper limit, the contrast of the sample X becomes weak, and the sample X is difficult to be observed.

A through-hole 6f is formed in the center of the collimator lens 6d, and the object optical system 5 is disposed inside the through-hole 6f. The collimator lens 6d and the object optical system 5 are concentrically arranged while sharing a common optical axis A. The collimator lens renders light incident from the LED light source 6a along an optical axis B parallel to the optical axis A of the object optical system 5 to approximately parallel light, and emits a parallel luminous flux while tilting the luminous flux toward the optical axis A.

The approximately parallel light emitted while being tilted by the collimator lens 6d is reflected from the top plate 2a of the container 2 disposed on the upper side. The reflected approximately parallel light is transmitted through a liquid Y and the sample X within the container 2 which are disposed on the lower side and the pedestal 3a of the stage 3, and then is incident on the object optical system 5.

Figure 3:
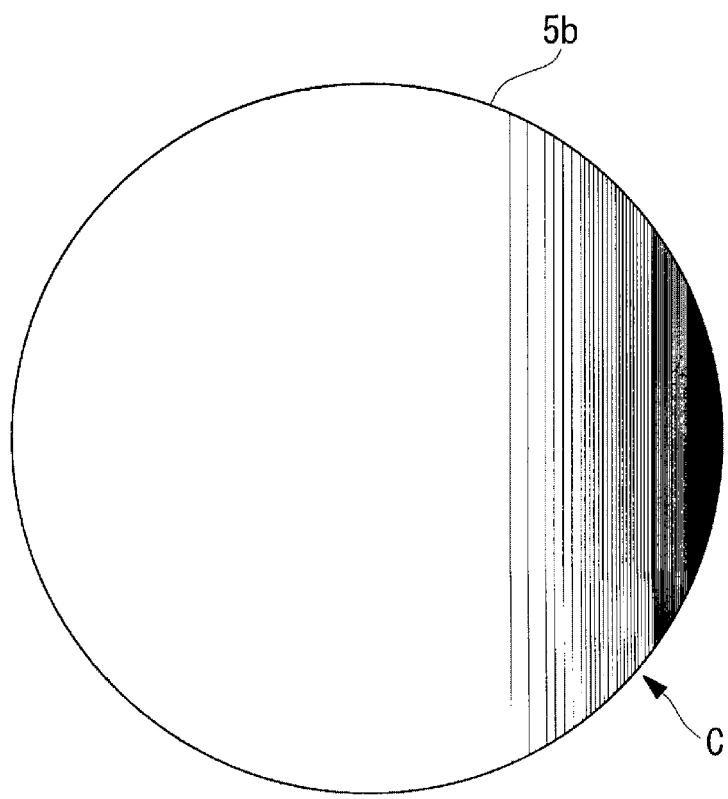
FIG. 3 is a front view showing an example of a pupil modulation element provided in the observation device of FIG. 1.

The object optical system 5 includes the object lens 5a that concentrates transmission light incident from above, pupil modulation element 5b disposed near a pupil surface, a flare stop 5g, an imaging lens 5c, and an imaging element 5d. As shown in FIG. 3, the pupil modulation element 5b includes a region (low transmittance region) C in which transmittance is gradually decreased from the center of the pupil surface in one direction of a radial direction inside a brightness stop 5e disposed near the pupil surface. Reference sign 5f is a glass plate that supports the brightness stop 5e and the pupil modulation element 5b.

Hereinafter, an operation of the observation device 1 according to the present embodiment having such a configuration will be described.

The illumination light emitted from the LED light source 6a of the illumination optical system 6 is emitted vertically upward as a luminous flux restricted to an emission region having a predetermined size by being transmitted through the illumination mask 6c. The emitted luminous flux is converted into approximately parallel light by being transmitted through the collimator lens 6d disposed on the upper side, and becomes a luminous flux which is tilted toward the optical axis A of the collimator lens 6d.

The approximately parallel light headed upwards from the collimator lens 6d becomes oblique illumination which is transmitted through, the pedestal 3a constituting the stage 3, a bottom surface of the container 2, and the liquid Y is reflected from the top plate 2a of the container 2, and is diagonally applied on the sample X diagonally positioned on the lower side from above. The transmission light that is transmitted through the sample X is transmitted through the bottom surface of the container 2 and the pedestal 3a, and is concentrated by the object lens 5a. The concentrated light is transmitted through the pupil modulation element 5b, and is formed as an image by the imaging lens 5c. The formed image is captured by the imaging element 5d.

That is, as the illumination light which includes the approximately parallel light diagonally transmitted through the sample X from above, the transmission light transmitted through the sample X is concentrated by the object lens 5a. Since the transmission light transmitted through a region in which the sample X is not present is incident as the approximately parallel light on the object lens 5a without being refracted, after an image of the opening 6e of the illumination mask 6c is projected on the pupil modulation element 5b disposed on the pupil surface of the object lens 5a, the projected image is formed by the imaging lens 5c, and the formed image is captured by the imaging element 5d.

Figure 4:
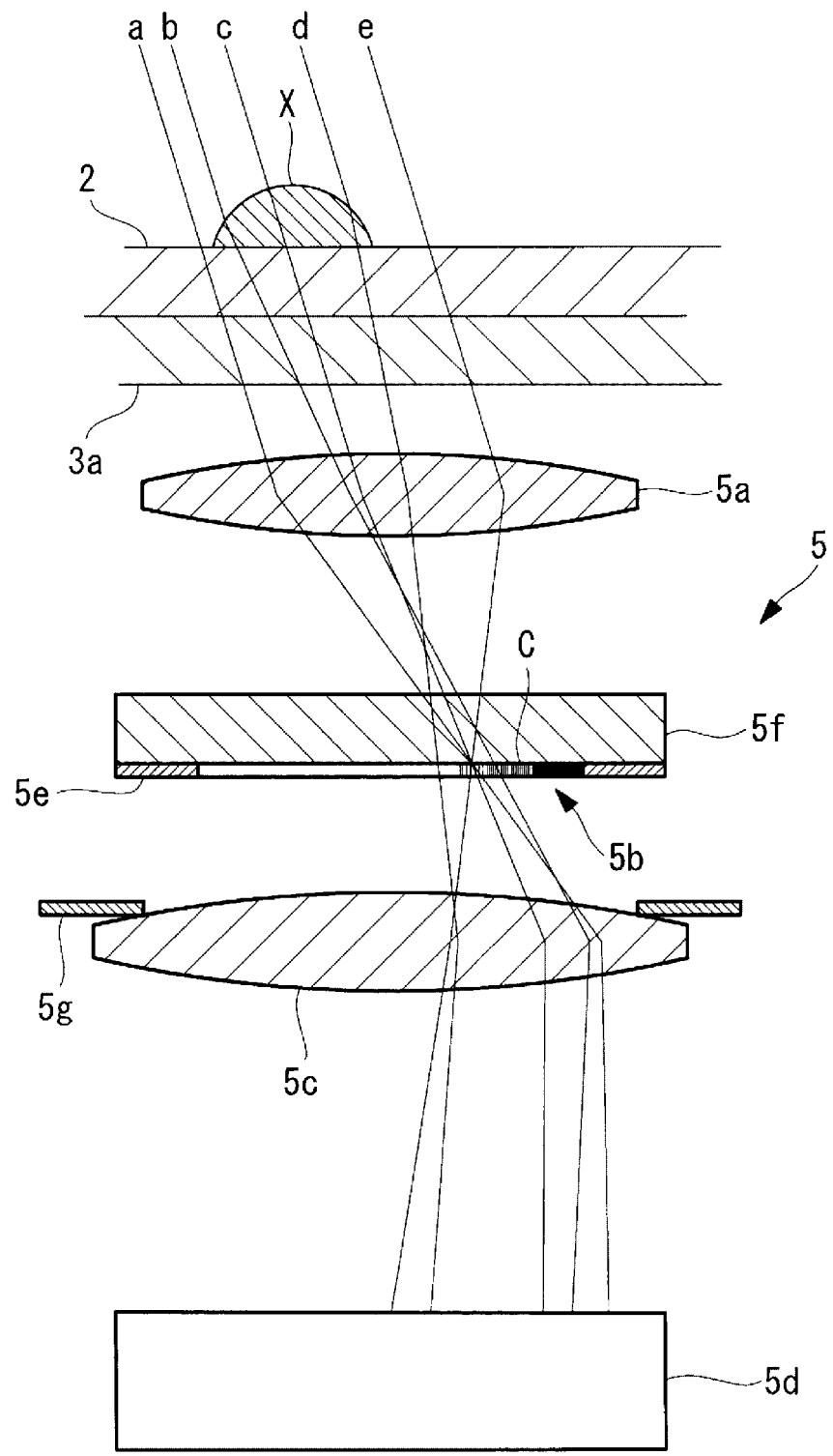
FIG. 4 is a longitudinal sectional view showing an object optical system for describing an operation of the observation device of FIG. 1.

The transmission light transmitted through a region in which the sample X is present is refracted due to a difference between a refractive index of the sample X and a refractive index of a surrounding region. In FIG. 4, since light rays a and e which are not transmitted through the sample X and a light ray c which is perpendicularly incident on a front surface of the sample X are transmitted through the low transmittance region C in which a transmittance between an edge and a center of the pupil modulation element 5b without being refracted is slightly low, an image having medium brightness is formed.

Meanwhile, in FIG. 4, the light ray b transmitted through a left end of the sample X is refracted, and is transmitted through a region close to the edge of the pupil modulation element 5b. Since as the low transmittance region C of the pupil modulation element 5b becomes closer to the edge, the transmittance becomes lower, a dark image is formed.

In FIG. 4, the light ray d transmitted through a right end of the sample X is refracted, and is transmitted through a region close to the center of the pupil modulation element 5b. Since the transmittance of the pupil modulation element 5b is high in this position, a bright image is formed.

Figure 5:
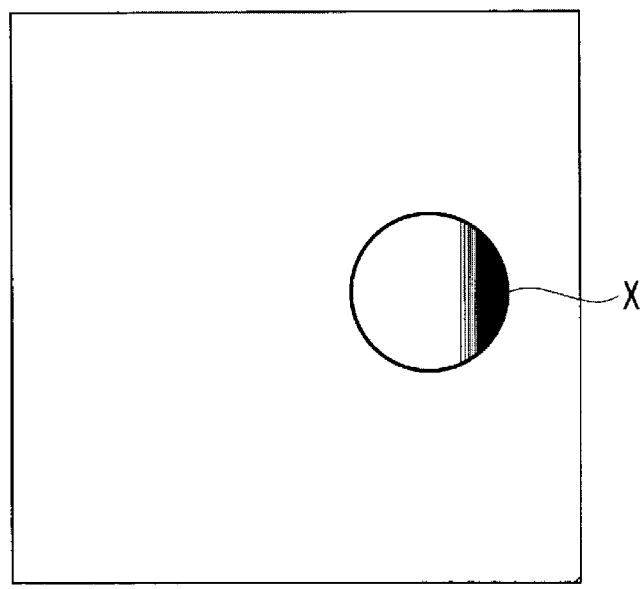
FIG. 5 is a diagram showing an example of an image of a sample acquired by the observation device of FIG. 1.

As a result, it is possible to acquire a high-contrast image of which brightness unevenness is less and the sample X is shaded, as shown in FIG. 5. That is, since the sample X is seen in three dimensions due to shadows, the easiness of observation is improved.

In this case, according to the present embodiment, since the transmission light refracted by the sample X is not blocked by the edge of the brightness stop 5e disposed on the pupil surface and the intensity of the transmission light is partially changed by the pupil modulation element 5b having the low transmittance region C which is disposed on the pupil surface and has partially different transmittance, an incidence angle of the illumination light is set to be less than an acceptance angle (NA) of the object lens 5a, and a light ray height of the transmission light transmitted the inside of the object optical system 5 is set to be low. Thus, there is an advantage that it is possible to prevent vignetting of the light ray due to the flare stop 5g. As a result, the brightness unevenness of the entire image is reduced, and it is possible to perform observation using an easily viewable image.

Figure 6:
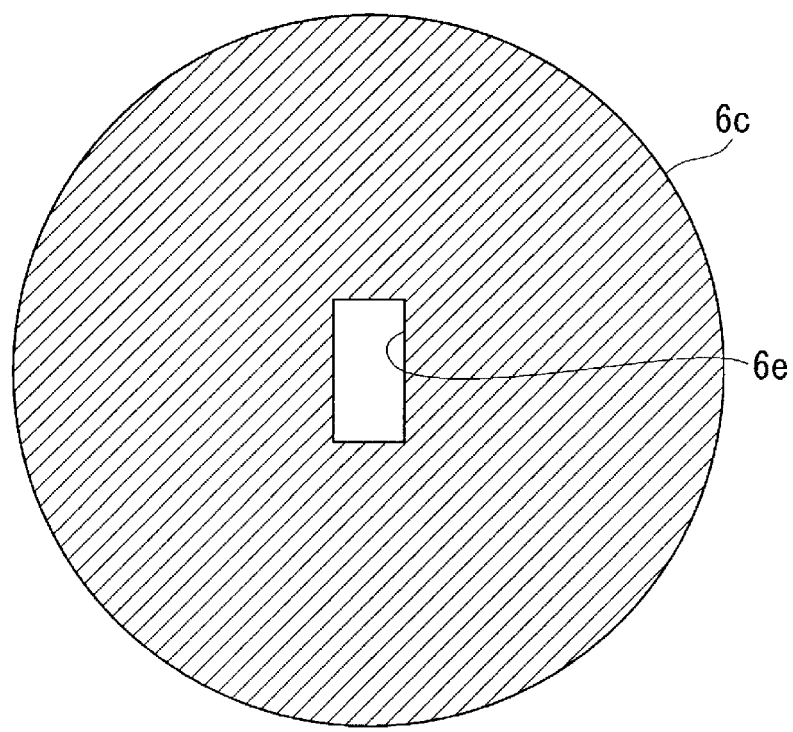
FIG. 6 is a front view showing a modification example of the illumination mask of FIG. 2.
Figure 7:
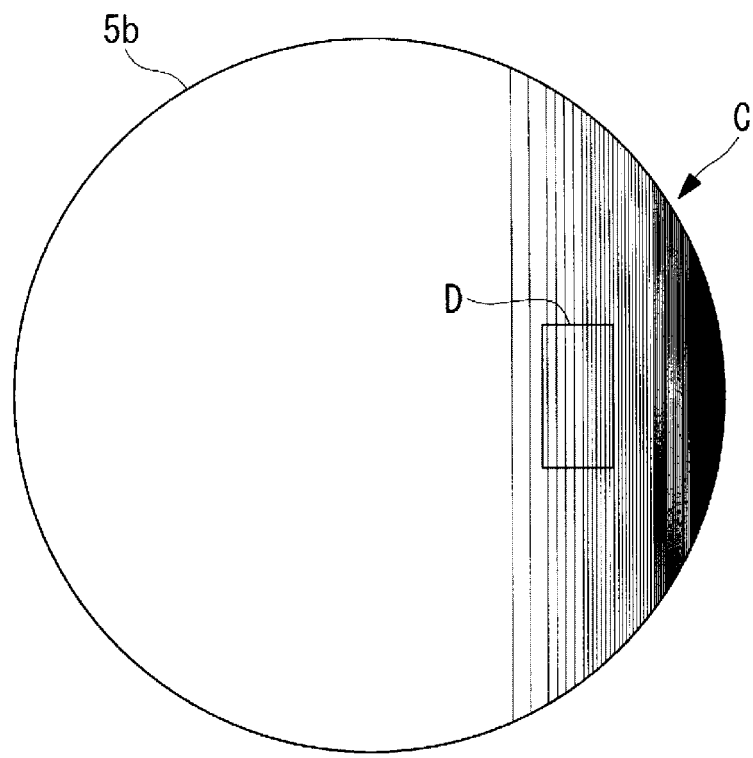
FIG. 7 is a diagram showing an example in which an emission region of the illumination mask of FIG. 6 is projected on the pupil modulation element of FIG. 3.

Although it has been described in the present embodiment that the circular opening 6e is formed in the illumination mask 6c, a rectangular opening 6e which is short in a direction in which the illumination light tilts and is long in a direction perpendicular to the tilt direction of the illumination light may be formed as shown in FIG. 6. With such a configuration, an image D of the opening 6e projected on the pupil modulation element 5b can be disposed so as to be short in a direction in which the transmittance is changed, as shown in FIG. 7.

When the opening 6e is formed in the circular shape, since the illumination light is closer to the parallel light, there is an inconvenience that foreign matter is to be easily reflected within the object optical system 5. However, the opening is formed in the rectangular shape as shown in FIG. 6. Thus, since the illumination light is incident in various directions, there is an advantage that the foreign matter is not able to be easily reflected while maintaining contrast.

Figure 8:
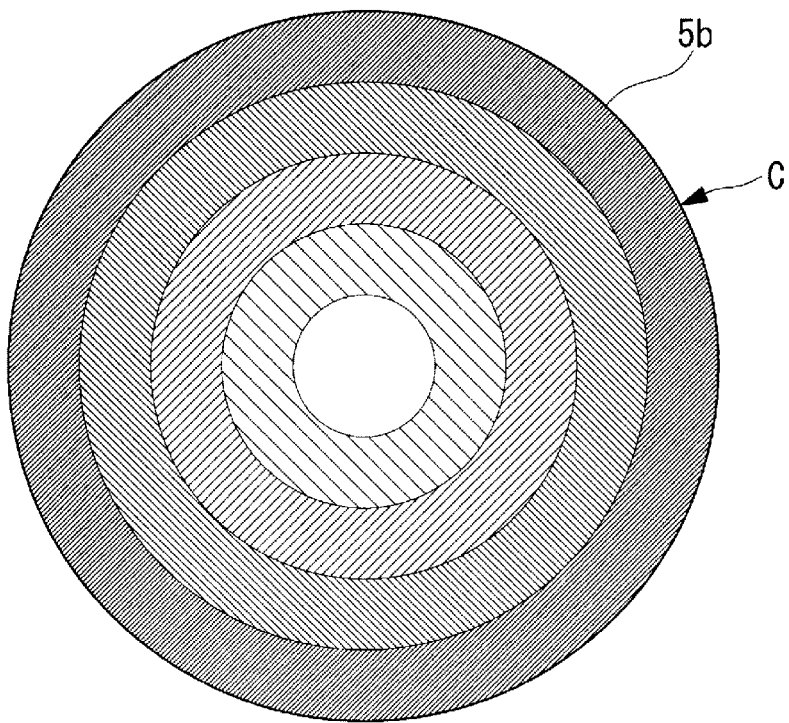
FIG. 8 is a front view showing a modification example of the pupil modulation element of FIG. 3.

The direction in which the transmittance of the pupil modulation element 5b is changed may be set while the opening 6e is formed in the circular shape such that the transmittance becomes low toward the outside in the radial direction over the entire circumference, as shown in FIG. 8. Accordingly, the low transmittance region C has a transmittance gradient in a concentric circle.

With such a configuration, there is an advantage that it is not necessary to perform an operation of matching the direction in which the illumination light tilts and a direction of the transmission gradient of the pupil modulation element 5b.

Hereinafter, an observation device 10 according to a second embodiment of the present invention will be described with reference to the drawings.

In the description of the present embodiment, portions in common to the configuration of the observation device 1 according to the first embodiment will be assigned the same reference signs, and thus, the description thereof will be omitted.

Figure 9:
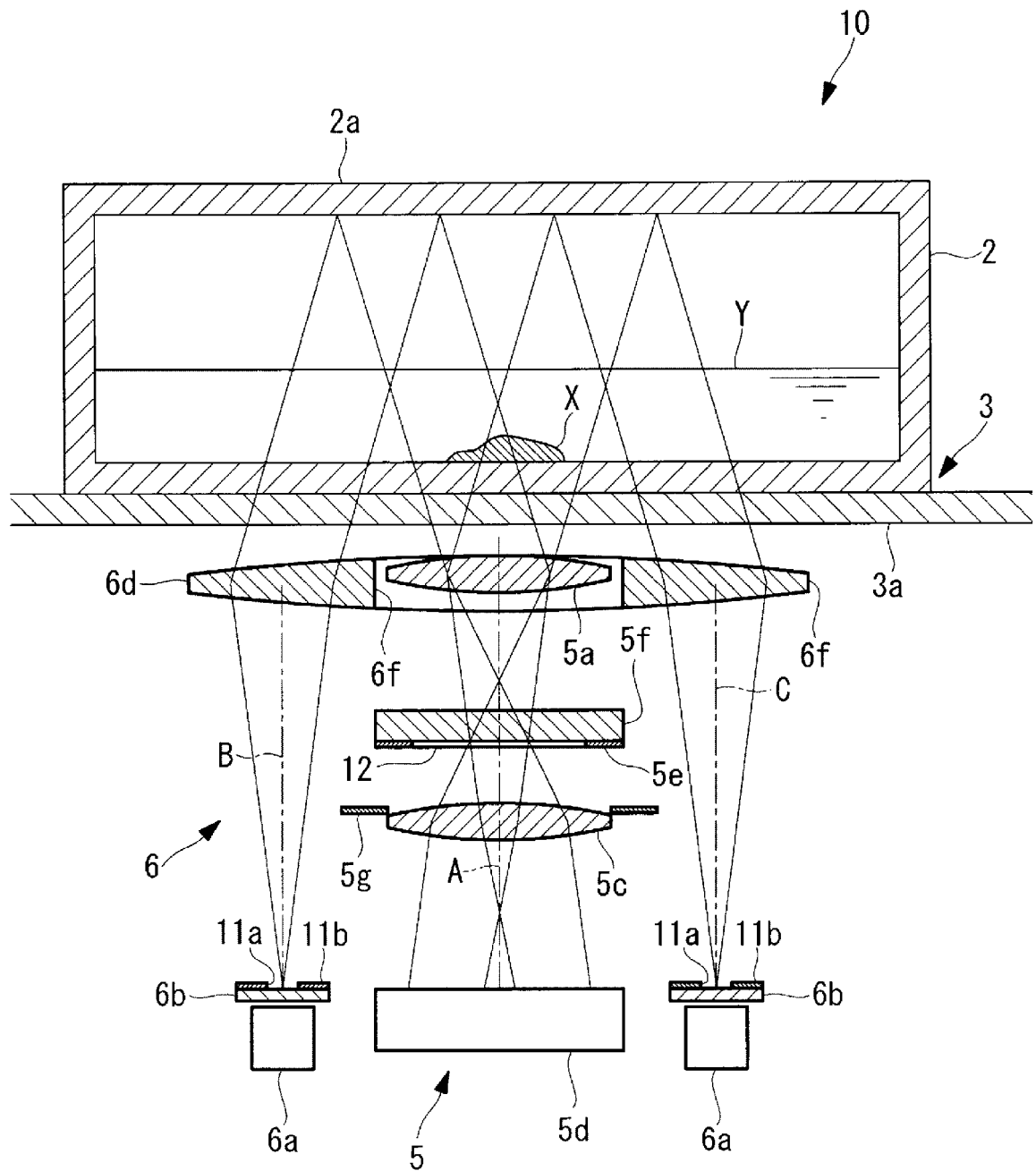
FIG. 9 is a longitudinal sectional view showing an observation device according to a second embodiment.

As shown in FIG. 9, an illumination optical system 11 and a pupil modulation element 12 of the observation device 10 according to the present embodiment are different from those of the observation device 1 according to the first embodiment.

Figure 10:
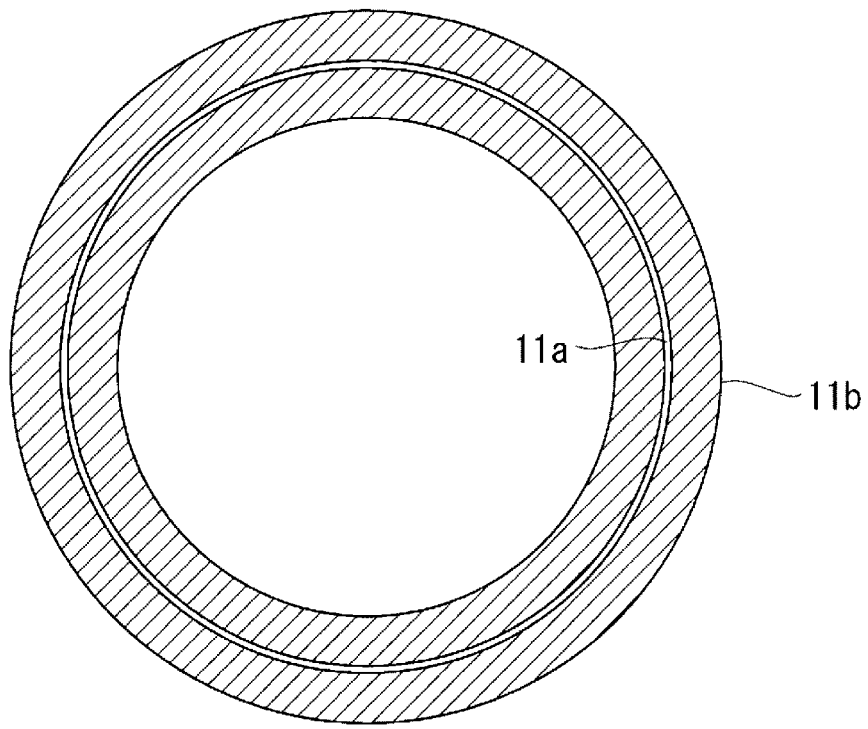
FIG. 10 is a front view showing an example of an illumination mask provided in the observation device of FIG. 9.
Figure 11:
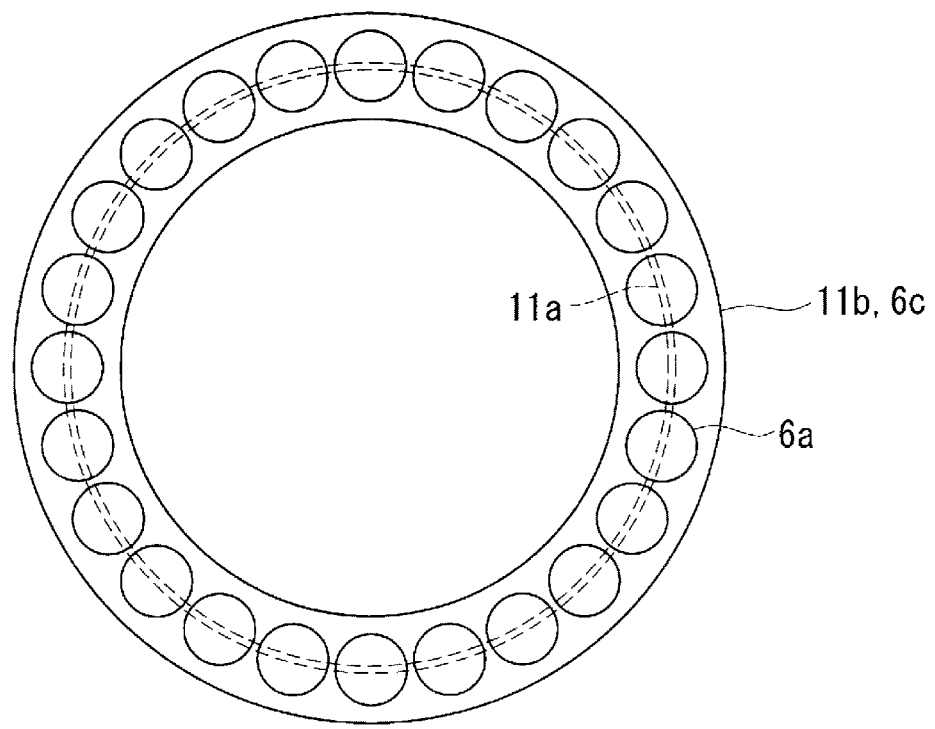
FIG. 11 is a diagram showing an arrangement example of LED light sources provided in the observation device of FIG. 9.

The illumination optical system 11 according to the present embodiment includes a plurality of LED light sources 6a arranged in an annular shape as shown in FIG. 11 and an illumination mask 11b having an annular slit 11a which restricts illumination light rays from the LED light sources 6a as shown in FIG. 10.

Figure 12:
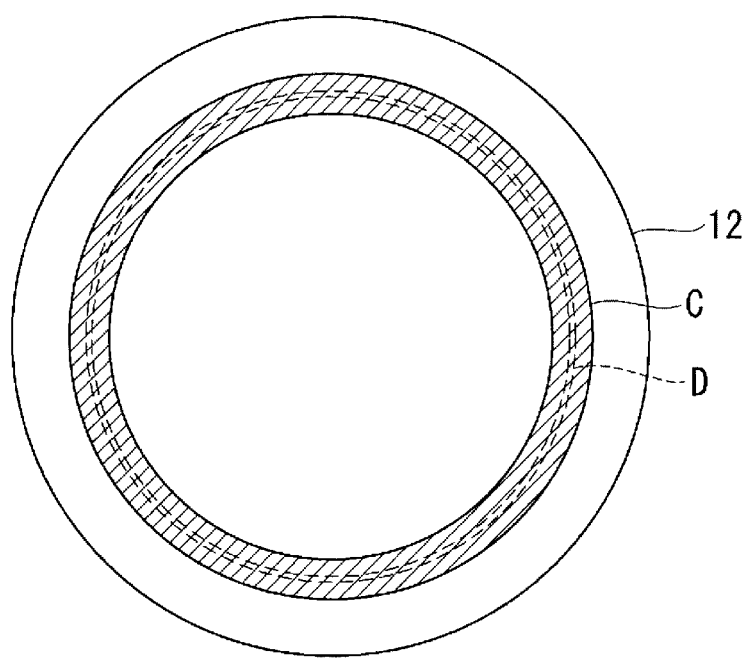
FIG. 12 is a diagram showing an example of a pupil modulation element provided in the observation device of FIG. 9 in which an emission region of the illumination mask of FIG. 10 is projected.

As shown in FIG. 12, the pupil modulation element 12 includes a low transmittance region C which is formed in an annular shape so as to include a region D in which the annular slit 11a of the illumination mask 11b is projected and has transmittance lower than that of a surrounding region.

An operation of the observation device 10 according to the present embodiment having such a configuration will be described below.

In accordance with the observation device 10 according to the present embodiment, the illumination light rays transmitted through the slit 11a of the illumination mask 11b are converted into approximately parallel light rays by the collimator lens 6d, are reflected from the top plate 2a of the container 2, and are incident on the object optical system 5 at an angle smaller than the acceptance angle of the object lens 5a.

Accordingly, the light ray height of the transmission light rays transmitted through the inside of the object optical system 5 becomes low, and the blocking of the light rays due to the flare stop 5g or the like is decreased. Thus, it is possible to prevent brightness unevenness.

Figure 13:
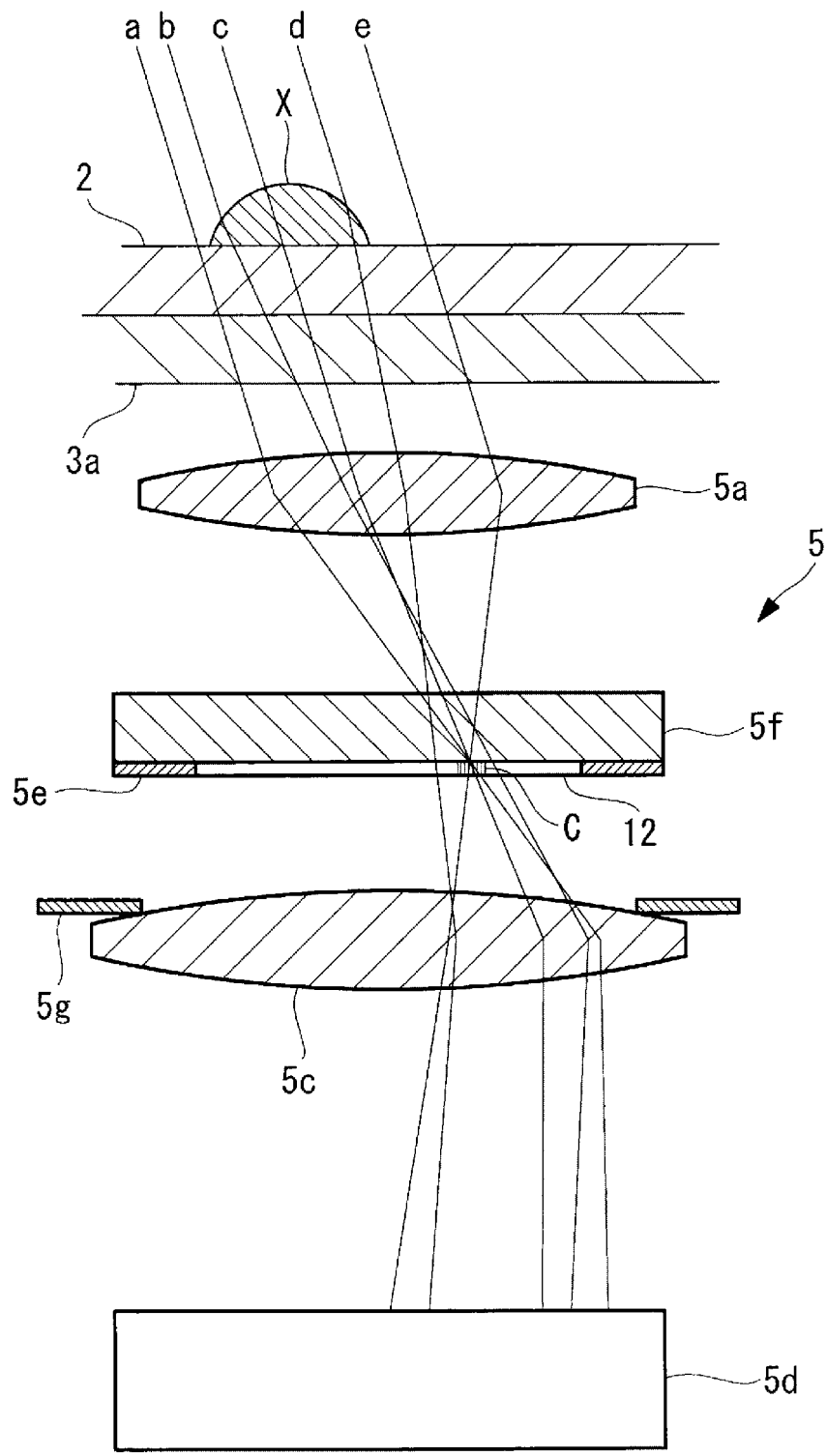
FIG. 13 is a longitudinal sectional view showing an object optical system for describing an operation of the observation device of FIG. 9.

In this case, as shown in FIG. 13, since light rays a and e which are not transmitted through the sample X and a light ray c which is incident on a front surface of the sample X at a right angle are transmitted through the low transmittance region C of the pupil modulation element 12, the light amount is attenuated, and a dark image is formed.

In FIG. 13, the transmission light b transmitted through the left side of the sample X is refracted by the sample X, and is transmitted through a position shifted from the low transmittance region C of the pupil modulation element 12. Accordingly, the light amount is not attenuated by the pupil modulation element 12, and a bright image is formed.

In FIG. 13, the transmission light d transmitted through the right side of the sample X is also refracted by the sample X, and is transmitted through a position shifted from the low transmittance region C of the pupil modulation element 12. Accordingly, the light amount is not attenuated by the pupil modulation element 12, and a bright image is formed.

Figure 14:
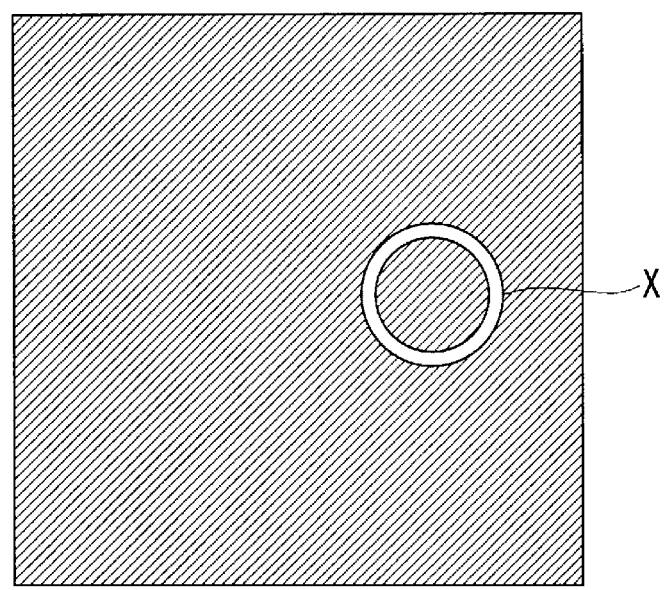
FIG. 14 is a diagram showing an example of an image of a sample acquired by the observation device of FIG. 9.

That is, in accordance with the observation device 10 according to the present embodiment, it is possible to acquire an image in which a peripheral portion of the sample X by which the illumination light rays are greatly refracted is bright and a position other than the peripheral portion is dark as shown in FIG. 14, and it is possible to observe the sample X at high contrast due to shades with no brightness unevenness as a whole. When the sample X is an achromatic cell, there is an advantage that it is possible to acquire an image of the sample X in which there is no brightness unevenness and shadows are isotropic.

As shown in FIG. 11, the LED light source 6a may be arranged in an annular shape in close contact with each other in a circumferential direction so as to match the shape of the annular slit 11a, or may be arranged at intervals in the circumferential direction.

Although it has been described that the pupil modulation element 12 has the annular low transmittance region C, the low transmittance region C may further have a function of delaying a phase. In this case, the width of the annular low transmittance region C may be set to greater than that of FIG. 12 so as to transmit the transmission light rays refracted by the sample X.

Figure 15:
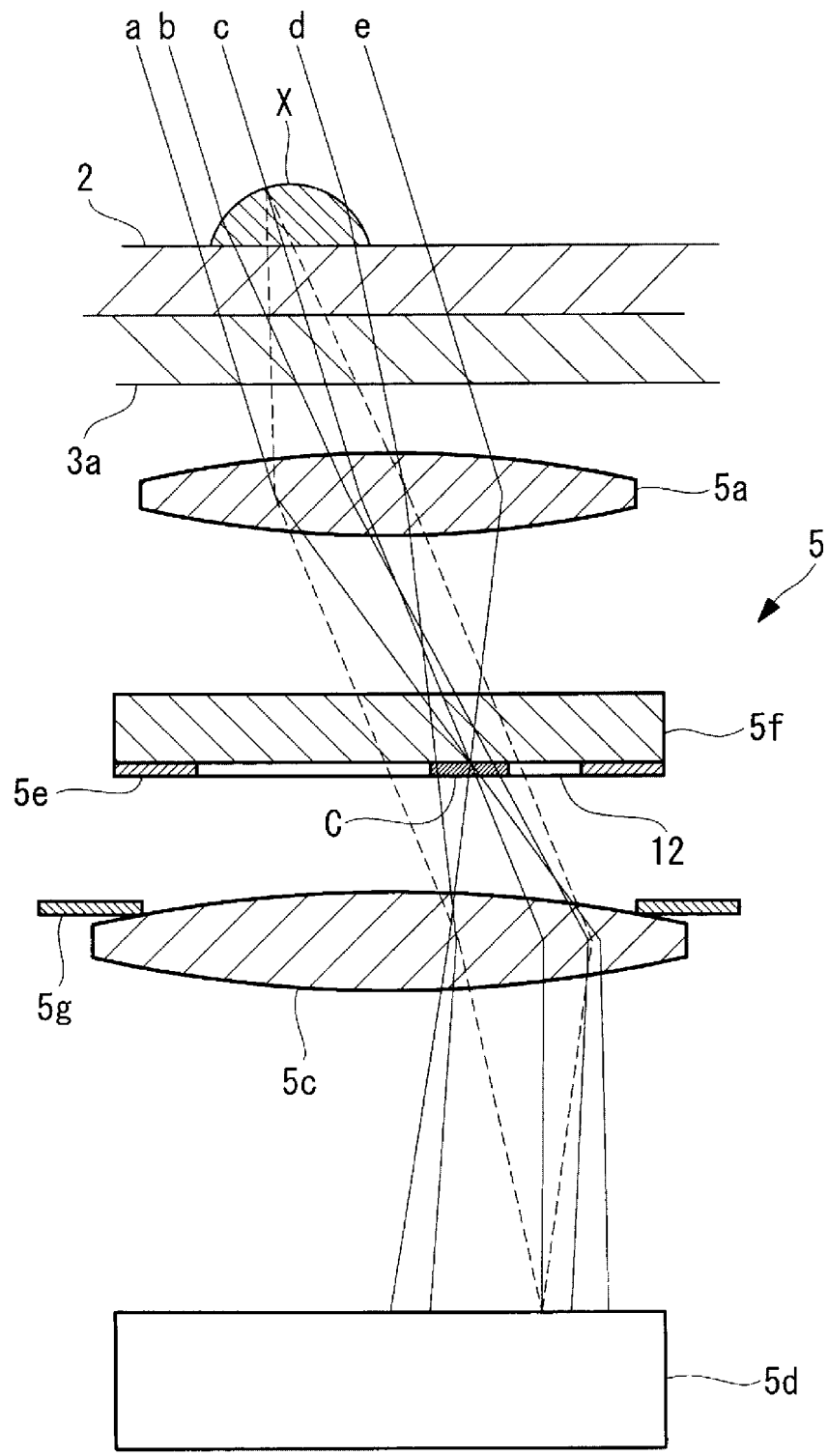
FIG. 15 is a longitudinal sectional view showing an object optical system for describing an operation of a modification example of the observation device of FIG. 9.

With such a configuration, as shown in FIG. 15, the light rays a and e which are not transmitted through the sample X are transmitted through the low transmittance region C of the pupil modulation element 12, and thus, these light rays reach the imaging element 5d after the light amount thereof is attenuated and the phase thereof is delayed. Accordingly, these light rays have moderate brightness.

The light rays b, c, and d transmitted through the sample X are divided into light rays (dashed lines) which are diffracted by a microstructure within the sample X and light rays (solid lines: zero-order diffracted light) which are not diffracted.

The zero-order diffracted light reaches the imaging element 5d after the zero-order diffracted light is attenuated by the low transmittance region C of the pupil modulation element 12 and the phase thereof is delayed.

The diffracted light is transmitted through a region having high transmittance other than the low transmittance region C of the pupil modulation element 12. Thus, the diffracted light reaches the imaging element 5d after the phase thereof is delayed by π/4 without being attenuated.

As a result, an image in which a portion other than the sample X has moderate brightness is acquired by the light rays which are not transmitted through the sample X. Meanwhile, the light ray transmitted through the sample X is branched through the diffraction. The zero-order diffracted light is transmitted through the low transmittance region C of the pupil modulation element 12, and another diffracted light is not transmitted through the low transmittance region C. As a result, these light rays interfere with each other, and are captured on the imaging element 5d.

Figure 16:
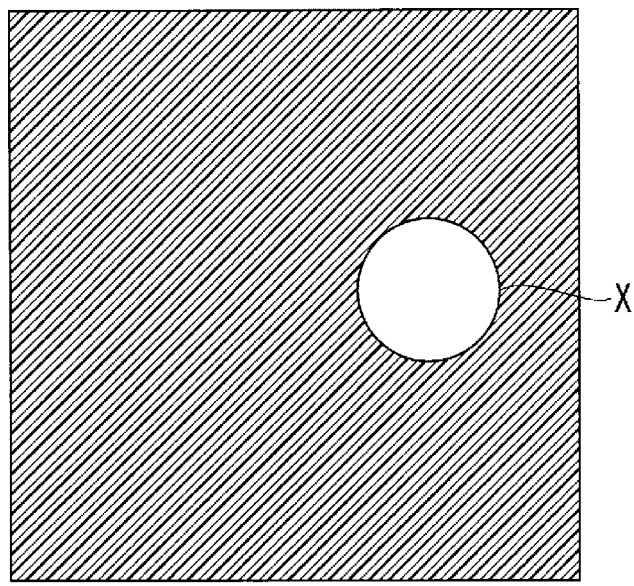
FIG. 16 is a diagram showing an example of an image of a sample acquired by the observation device of FIG. 15.
Figure 17:
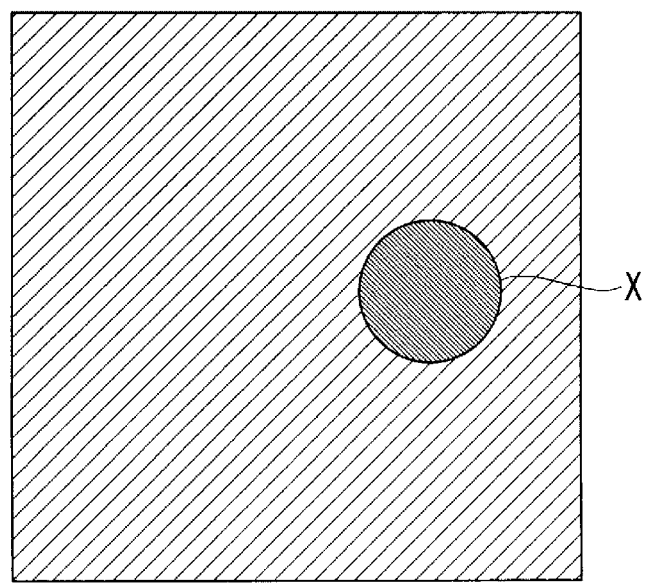
FIG. 17 is a diagram showing another example of the image of the sample acquired by the observation device of FIG. 15.

When a phase delay amount of the low transmittance region C is π/4, since the zero-order diffracted light and the another diffracted light have the same phase delay amount of π/4, a phase difference is zero, and a bright image is formed due to the interference, as shown in FIG. 16. Meanwhile, when the phase delay amount of the low transmittance region is 3π/4, since a phase difference between the zero-order diffracted light and the another diffracted light is π, a dark image is formed due to the interference, as shown in FIG. 17.

Accordingly, there are advantages that it is possible to perform the observation using an isotropic image in which there is no brightness unevenness even on the sample X and it is possible to observe the microstructure within the sample X by using the diffracted light.

Figure 18:
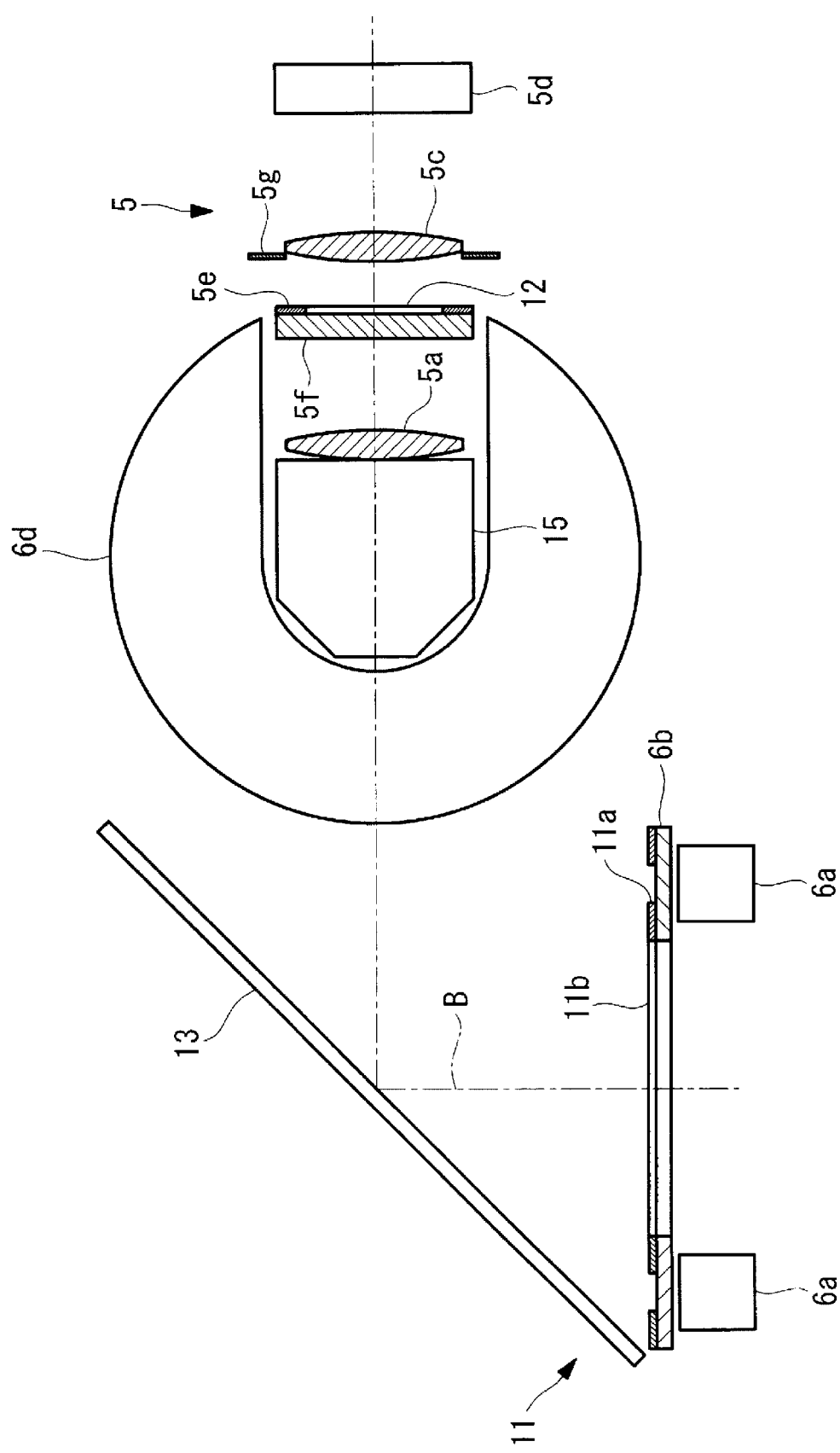
FIG. 18 is a plan view of an illumination optical system and an object optical system showing a modification example of the observation device of FIG. 1.
Figure 19:
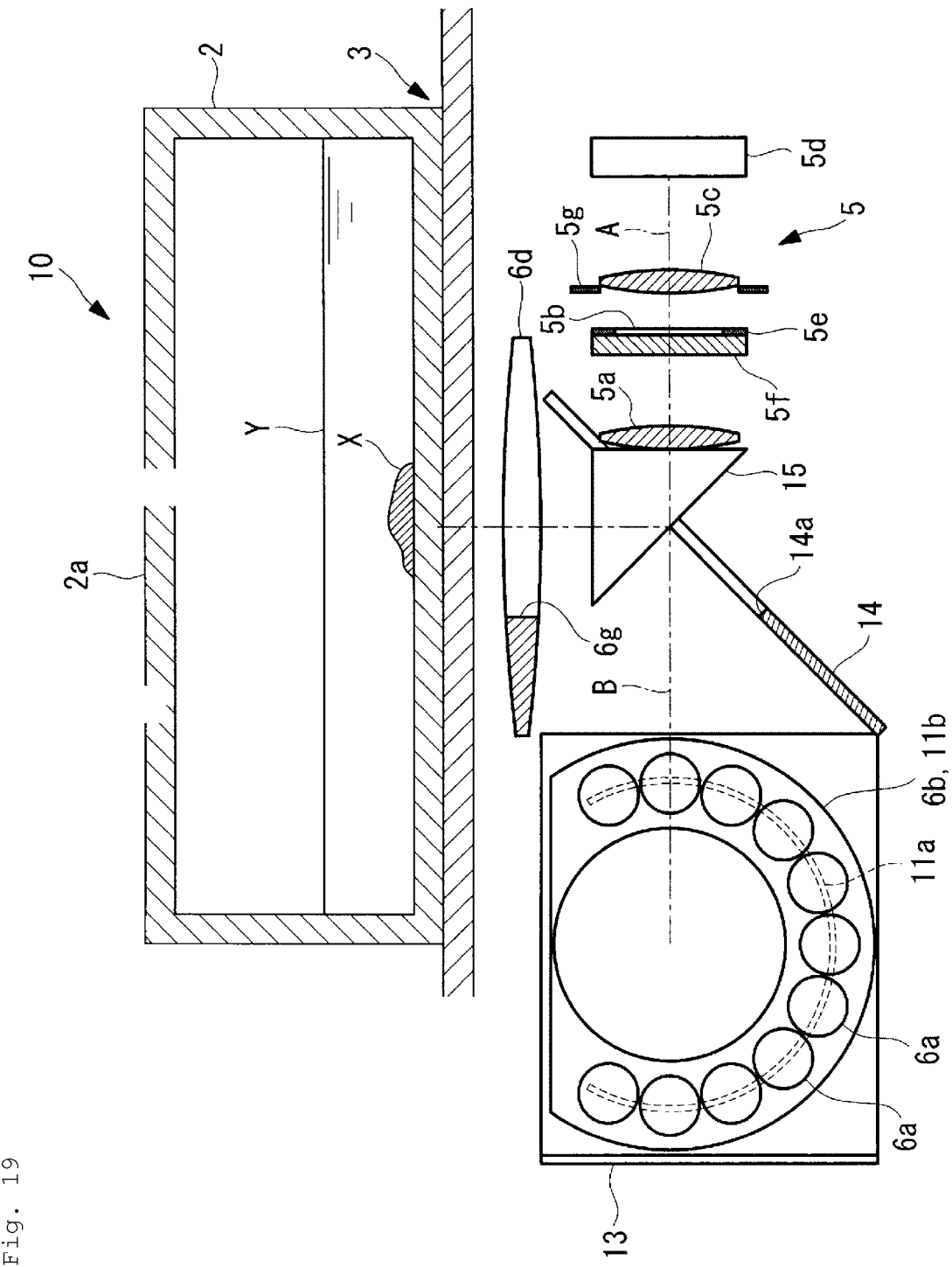
FIG. 19 is a longitudinal sectional view showing the observation device of FIG. 18.
Figure 20:
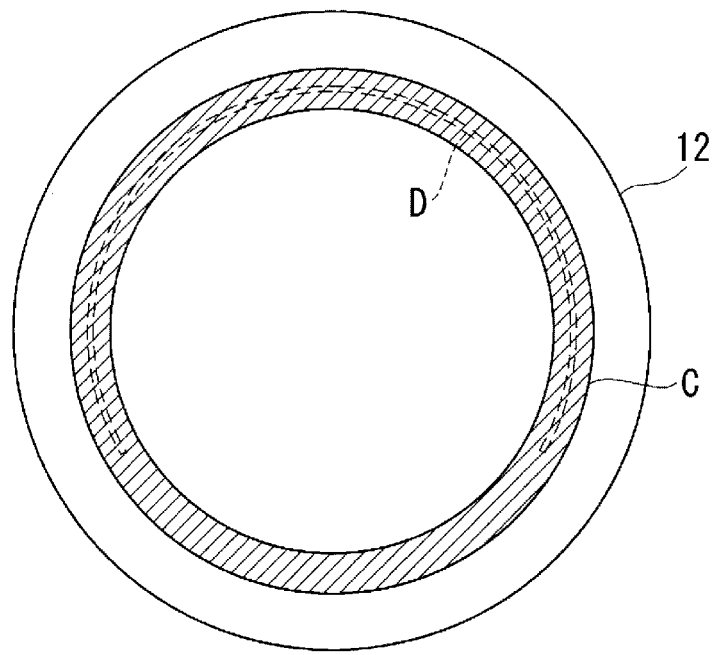
FIG. 20 is a diagram showing an example in which an emission region of an illumination mask of FIG. 19 is projected on a pupil modulation element provided in the observation device of FIG. 18.

Although it has been described in the present embodiment that the object optical system 5 and the illumination optical system 6 are arranged along the optical axes A and B extending in a direction parallel to the vertical direction, the illumination optical system 6 and the object optical system 5 are bent by using mirrors 13 and 14 or a prism 15, and thus, a space in an up and down direction may be reduced, as shown in FIGS. 18 to 20.

In the example shown in FIGS. 18 and 19, the illumination optical system 6 deflects the illumination light rays from the plurality of LED light sources 6a, which is arranged in a semicircular arc shape within a vertical plane and emits light rays in the horizontal direction, in the horizontal direction by 90° by the mirror 13 disposed along the vertical direction at an angle of 45° with respect to the optical axis B of the illumination light, and further deflects the illumination light rays in the vertical direction by 90° by the arc-shaped mirror 14 which is diagonally disposed in the horizontal direction at an elevation angle of 45°. Accordingly, the illumination light rays which are vertically incident on the collimator lens 6d from below are generated similarly to the first embodiment.

Meanwhile, as shown in FIG. 19, the object optical system 5 includes an object lens 5a, a pupil modulation element 5b, a flare stop 5g, an imaging lens 5c, and an imaging element 5d which are arranged in a horizontal direction, and includes a prism 15 disposed in front of the object lens 5a. The object optical system is configured such that the transmission light from the sample X is deflected by 90° by the prism 15 and is incident on the object lens 5a.

Since the collimator lens 6d and the mirror 14 has a cutout portion 6g for accommodating the object optical system 5 extending in the horizontal direction, an illumination mask 6c has a shape in which a part of the circumferential direction is cut out, as shown in FIG. 19. Accordingly, the image of the opening 6e of the illumination mask 6c projected on the pupil modulation element 5b is as shown in FIG. 20.

With such a configuration, in the first and second embodiments, the dimension in the vertical direction is greatly reduced by bending the illumination optical system 6 and the object optical system 5 which extend in the vertical direction in the horizontal direction, and thus, there is an advantage that it is possible to reduce the size of the observation devices 1 and 10.

Figure 21:
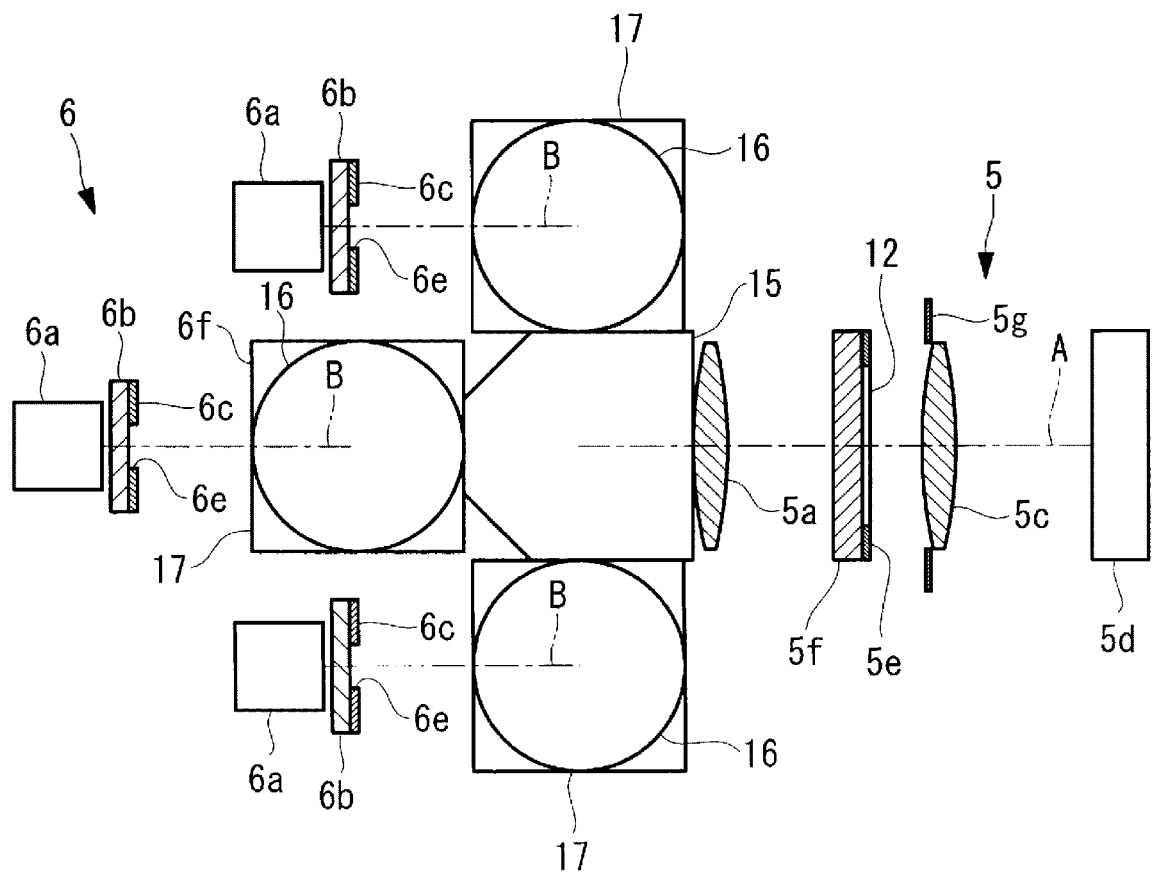
FIG. 21 is a plan view of an illumination optical system and an object optical system showing another modification example of the observation device of FIG. 1.
Figure 22:
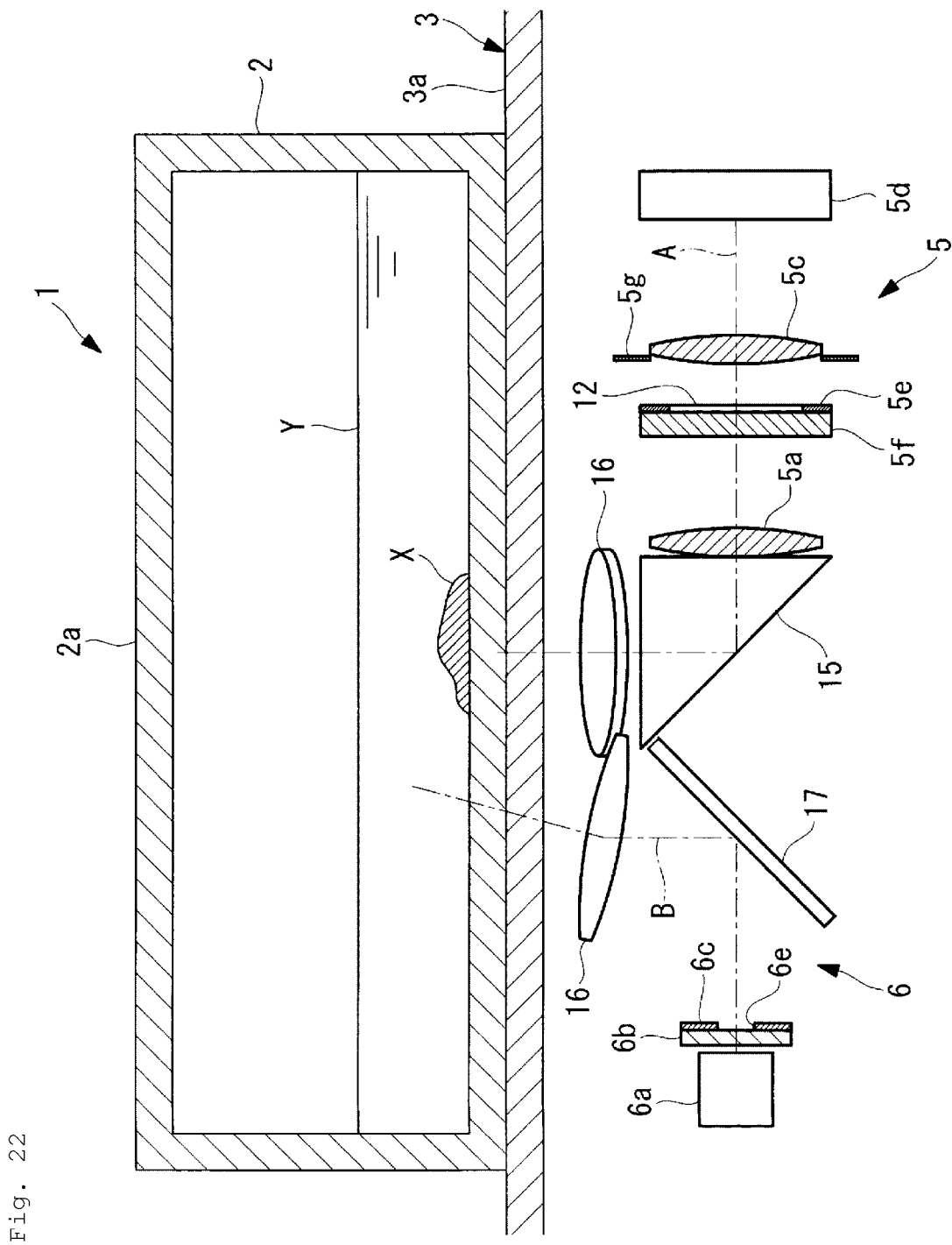
FIG. 22 is a longitudinal sectional view showing the observation device of FIG. 21.

Although it has been described in the present embodiment that the oblique illumination light which diagonally tilts upwards is generated by using the ring-shaped collimator lens 6d coaxial with the object optical system 5 which is the center and causing the illumination light to be incident on the outside of the axis, the illumination light may be similarly generated by disposing an individual collimator lens 16 in each LED light source 6a and diagonally tilting the optical axis of each collimator lens 16 as shown in FIGS. 21 and 22.

In the example shown in FIGS. 21 and 22, the illumination masks 6c are respectively provided in three LED light sources 6a that emit light rays in the horizontal direction, a mirror 17 that deflects the light ray from each LED light source 6a upwards is provided for each LED light source 6a, and the collimator lens 16 disposed so as to tilt the optical axis such that the deflected light ray is converted into approximately parallel light which is diagonally headed upwards is provided for each LED light source 6a.

Figure 23:
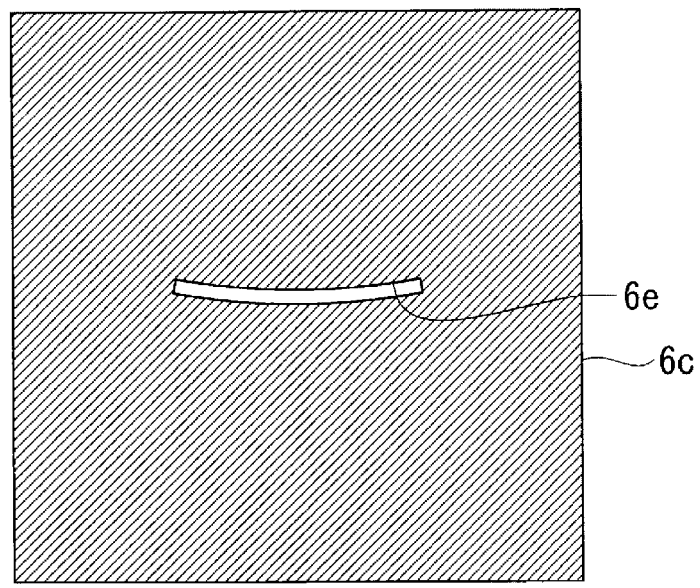
FIG. 23 is a front view showing an example of an illumination mask provided in the observation device of FIG. 21.
Figure 24:
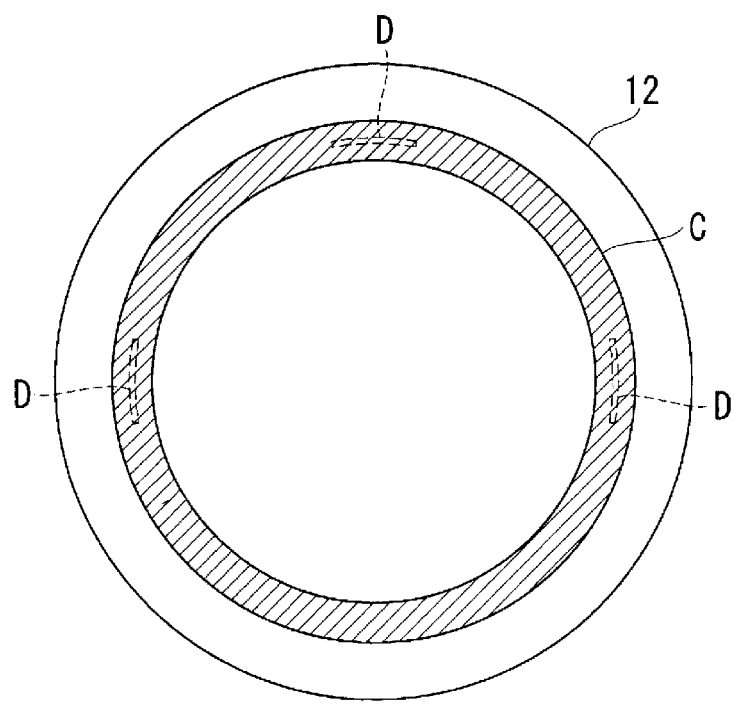
FIG. 24 is a diagram showing an example in which an emission region of the illumination mask of FIG. 23 is projected on a pupil modulation element provided in the observation device of FIG. 21.

As shown in FIG. 23, the shape of the opening 6e of each illumination mask 6c is formed in an arch slit shape so as to form a part of the same annular zone. Accordingly, the opening 6e of the illumination mask 6c projected on the pupil modulation element 5b is as shown in FIG. 24.

With such a configuration, it is possible to reduce the focal length of the collimator lens 16 without using the large collimator lens 6d and the mirrors 13 and 14. Accordingly, there is an advantage that it is possible to further reduce the size of the observation device 1.

Figure 25:
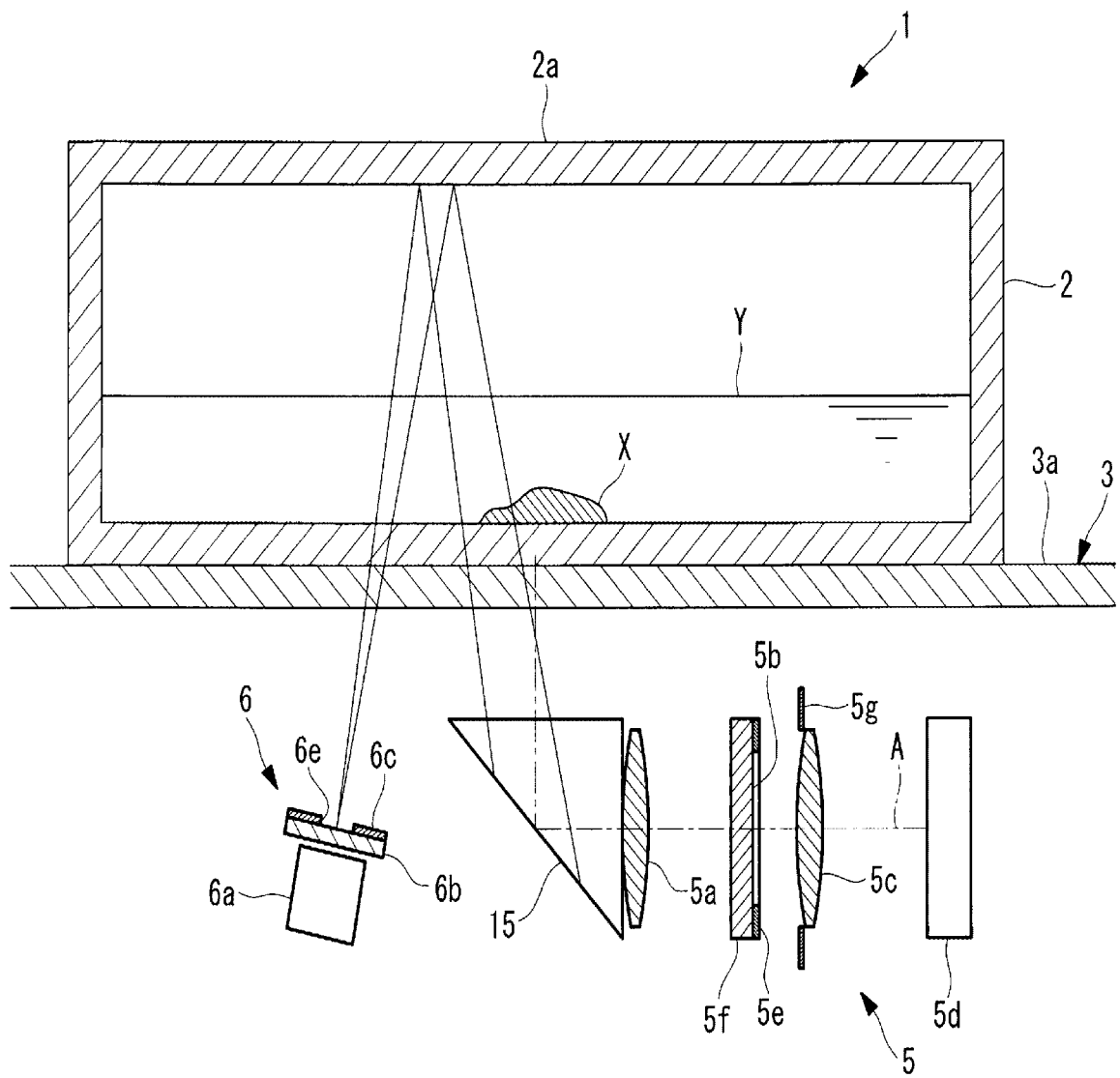
FIG. 25 is a longitudinal sectional view showing another modification example of the observation device of FIG. 1.

Although it has been descried in the present embodiment that the collimator lenses 6d and 16 which render the light rays incident on the object optical system 5 to the approximately parallel light rays are used in order to project the opening 6e of the illumination mask 6c on the pupil modulation element 5b, it is possible to regard the light rays incident on the object optical system 5 as the approximately parallel light rays when it is possible to sufficiently secure the distance between the LED light source 6a and the sample X. As shown in FIG. 25, the collimator lenses 6d and 16 may not be provided. Accordingly, it is possible to further reduce the size of the device. Such embodiment may be modified with a plurality of LED light sources 6a.

Figure 26:
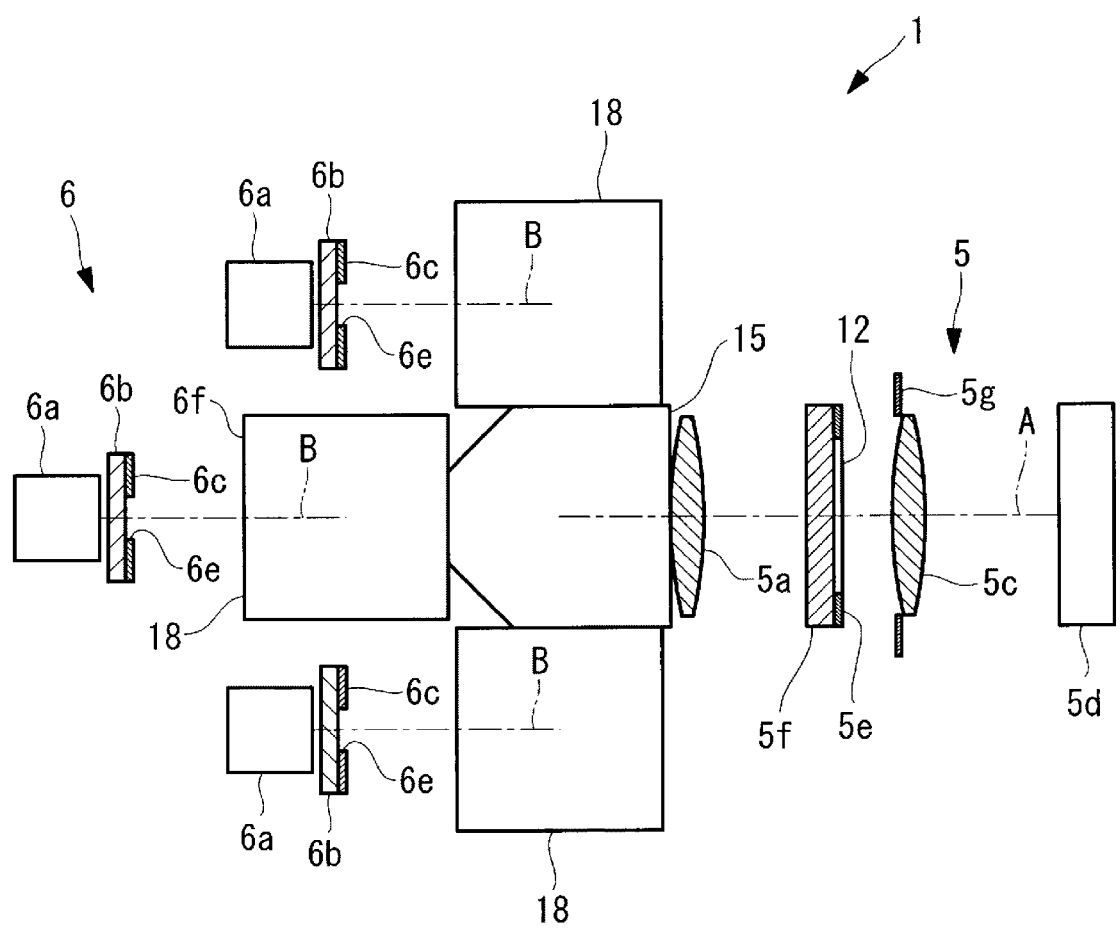
FIG. 26 is a plan view of an illumination optical system and an object optical system showing a modification example of the observation device of FIG. 25.

As shown in FIG. 26, the present embodiment may be applied to the illumination optical system 6 that reflects light rays from the LED light sources 6a by using the mirror 18. Accordingly, there is an advantage that it is possible to further increase a degree with which the transmission light rays incident on the object optical system 5 are parallel to each other by securing a sufficient distance between the LED light source 6a and the sample X while reducing the size of the device.

Although it has been described in the aforementioned embodiments that the LED light source 6a is used as the light source, the present embodiments are not limited thereto.

While there has been shown and described what is considered to be preferred embodiments, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

REFERENCE SIGNS LIST 1, 10: observation device
5: object optical system
5b, 12: pupil modulation element
6, 11: illumination optical system
6a: LED light source (light source)
6c, 11b: illumination mask (mask)
6d: collimator lens
C: low transmittance region
X: sample

What is claimed is:

1. An observation device comprising:
a stage having a pedestal over which a solid sample is located, the pedestal being made of transparent material;
an illumination optical system located under the pedestal, the illumination optical system emitting illumination light toward the pedestal; and
an object optical system located under the pedestal, the object optical system capturing transmission light, the transmission light being generated from the illumination light emitted from the illumination optical system, reflected off a reflection surface over the sample, and transmitted through the sample,
wherein a first light path in the illumination optical system is different from a second light path in the object optical system,
in a first pupil surface of the illumination optical system, the illumination optical system generates the illumination light by restricting light to a first transparent region,
in a second pupil surface of the object optical system, the object optical system restricts the transmission light in a second transparent region, and
the second transparent region has a first subregion and a second subregion whose transmittance is different from the first subregion, the second subregion being located between the first subregion and an edge of the second transparent region.

2. The observation device according to claim 1, wherein the transmittance is changed continuously or in stages in the second subregion.

3. The observation device according to claim 2, wherein the transmittance is decreased toward an edge of the second pupil surface in the radial direction in the second subregion.

4. The observation device according to claim 3, wherein the transmittance is decreased toward the outside of the second pupil surface in the radial direction over an entire circumference in the second subregion.

5. The observation device according to claim 1, wherein the transmittance of the second subregion is lower than a transmittance of another region of the second transparent region.

6. The observation device according to claim 5, wherein a phase of the transmission light being transmitted is changed in the second subregion.

7. The observation device according to claim 5, wherein the second subregion is formed in a shape of at least a part of an annular shape.

8. The observation device according to claim 1, wherein the illumination optical system includes a light source and a collimator lens that converts light from the light source to approximately parallel illumination light.

9. The observation device according to claim 1, wherein a part of the second pupil surface partially changes a phase of the transmission light.

10. An observation device comprising:
a stage having a pedestal, a solid sample being located on a first side of the pedestal, the pedestal being made of transparent material;
an illumination optical system located on a second side of the pedestal such that the illumination optical system emits illumination light toward the pedestal; and
an object optical system located on the second side of the pedestal, the object optical system capturing transmission light, the transmission light being generated from the illumination light emitted from the illumination optical system, reflected off a reflection surface on the first side and transmitted through the sample, the sample being between the pedestal and the reflecting surface,
wherein a first light path in the illumination optical system is different from a second light path in the object optical system,
in a first pupil surface of the illumination optical system, the illumination optical system generates the illumination light by restricting light to a first transparent region, and
in a second pupil surface of the object optical system, the object optical system restricts the transmission light in a second transparent region, and
the second transparent region has a first subregion and a second subregion whose transmittance is different from the first subregion, the second subregion being located between the first subregion and an edge of the second transparent region.

* * * * *